United States Patent [19]

Kuratsuji et al.

[11] Patent Number: 4,611,049

[45] Date of Patent: Sep. 9, 1986

[54] PROCESS FOR PRODUCING AROMATIC POLYESTER

[75] Inventors: Taketoshi Kuratsuji, Matsuyama; Tetsuro Miki, Hino, both of Japan

[73] Assignee: Teijin Limited, Osaka, Japan

[21] Appl. No.: 727,088

[22] Filed: Apr. 25, 1985

Related U.S. Application Data

[62] Division of Ser. No. 618,255, Jun. 7, 1984, abandoned.

[51] Int. Cl.$^4$ ............................................. C08G 63/34
[52] U.S. Cl. ..................... 528/279; 528/176; 528/179; 528/180; 528/181; 528/195; 528/274; 528/283; 528/298; 528/302; 528/308.6; 528/308.8
[58] Field of Search ........ 528/274, 279, 283, 179–181, 528/176, 195, 298, 302, 308.6, 308.8

[56] References Cited

U.S. PATENT DOCUMENTS

| | | | |
|---|---|---|---|
| 3,594,350 | 7/1971 | Lofquist et al. | 528/274 |
| 3,984,379 | 10/1976 | Oka et al. | 528/274 |
| 4,229,332 | 10/1980 | Kyo et al. | 528/128 |
| 4,511,708 | 4/1985 | Kasuga et al. | 528/274 |
| 4,539,386 | 9/1985 | Yoon | 528/173 |

*Primary Examiner*—Lester L. Lee
*Attorney, Agent, or Firm*—Sherman and Shalloway

[57] ABSTRACT

A process for producing an aromatic polyester having an aromatic dicarboxylic acid as a main acid component and trimethylene glycol or tetramethylene glycol as a main glycol component from a starting material composed mainly of an aromatic dicarboxylic acid or its functional derivative and trimethylene glycol or tetramethylene glycol; wherein at least one organometallic catalyst selected from the group consisting of organotitanium compounds and organotin compounds and at least one promoter selected from the group consisting of organic sulfonic acids and aliphatic carboxylic acids and being capable of increasing the catalyst activity of the organometallic catalyst are added to the reaction system so that the promoter increases the catalytic activity of the organometallic catalyst, and an aromatic polyester having an increased degree of polymerization is formed at an increased rate of polymerization.

13 Claims, No Drawings

PROCESS FOR PRODUCING AROMATIC POLYESTER

This is a division of application Ser. No. 618,255, filed June 7, 1984, abandoned.

This invention relates to a process for producing an aromatic polyester. More specifically, it relates to a process for producing an aromatic polyester containing an aromatic dicarboxylic acid and trimethylene glycol or tetramethylene glycol as main constituents.

There has been known a method for producing an aromatic polyester having terephthalic acid as a main dicarboxylic acid component and ethylene glycol as a main glycol component within a short period of time by using an aromatic sulfonic acid ester of the following formula

wherein Ar represents an aromatic group containing a heterocycle, R represents a $C_1$-$C_{18}$ alkyl or aryl group, and k is an integer of 1 to 3,
an aliphatic sulfonic acid ester of the following formula

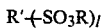

wherein R' represents an alkyl group including a cycloalkyl group, or an aralkyl group, l is an integer of 1 to 3, and R is as defined above,
or a halogenated sulfonic acid ester of the following formula $$X-SO_3R$$

wherein X represents a halogen atom and R is as defined above,
as a catalyst (see the specification of Japanese Laid-Open Patent Publication No. 119924/1982).

A method has also been known to produce an aromatic polyester having terephthalic acid and ethylene glycol as main constituents and possessing excellent transparency and color by using a sulfonic acid compound represented by the following formula

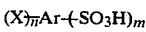

wherein Ar represents a benzene or naphthalene ring, X represents $-OR_1$, $-COOR_2$ or $-R_3$, each of $R_1$, $R_2$ and $R_3$ is a hydrogen atom or a lower alkyl group, and each of m and n is from 1 to 3, provided that when the sulfonic acid compound has one or more substituents on the ring, at least one substituent is $-OR_1$ or $-COOR_2$, and when n is 2 or larger, the two or more X's may be identical or different,
as a catalyst in an amount of $1 \times 10^{-6}$ to $10 \times 10^{-4}$ equivalent moles as the sulfonic group per mole of the acid component of the polyester (see the specification of Japanese Laid-Open Patent Publication No. 106218/1980).

These prior methods are based on the discovery that the aforesaid sulfonic acid ester or sulfonic acid has activity as a polycondensation catalyst for the production of an aromatic polyester. These methods, however, have the defect that the amount of diethylene glycol formed is large (see the working examples in these patent documents). Furthermore, investigations of the present inventors have shown that these catalysts do not substantially show activity as polycondensation catalysts when applied to a polycondensation reaction system for the production of an aromatic polyester having an aromatic dicarboxylic acid and trimethylene glycol or tetramethylene glycol as main constituents.

The specification of Japanese Laid-Open Patent Publication No. 222,109/1983 proposes a method for producing an aromatic polyester having terephthalic acid and ethylene glycol as main constituents within a short period of time by using as a polycondensation catalyst a compound represented by the following formula

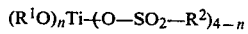

wherein $R^1$ represents an aliphatic group, $R^2$ represents an aliphatic or aromatic group, and n is an integer of from 1 to 3,
which corresponds to the reaction product of a titanic acid ester and an organic sulfonic acid compound.

Investigations of the present inventors have shown that when a titanic acid ester and an organic sulfonic acid which have previously been heated to an extent sufficient for their reaction are added to a system of polycondensation for producing an aromatic polyester having terephthalic acid and trimethylene glycol or tetramethylene glycol as main constituents, the polycondensation reaction proceeds at substantially the same rate as that at which the reaction proceeds in the presence of only the titanic acid ester as a catalyst.

The specification of Japanese Laid-Open Patent Publication No. 154,515/1981 discloses a polybutylene terephthalate copolymer which is prepared by copolymerizing a metal salt of sulfoisophthalic acid and an acid comonomer component selected from isophthalic acid, adipic acid, sebacic acid, and derivatives of these acids, contains 0.5 to 6 mole% of the acid comonomer component and has affinity for basic dyes and the property of being moderately decreased in weight upon contact with alkali; and fibers composed of the copolymer. The specification is quite silent on whether or not the acid comonomer component, i.e. isophthalic acid, adipic acid, sebacic acid or a derivative thereof promotes the polycondensation reaction.

It is an object of this invention therefore to provide a novel catalyst system for the production of an aromatic polyester having trimethylene glycol or tetramethylene glycol as a main glycol component.

Another object of this invention is to provide a novel catalyst system for the production of an aromatic polyester having trimethylene glycol or tetramethylene glycol as a main glycol component, which contains as a promoter an organic sulfonic acid or an aliphatic polycarboxylic acid that does not substantially show catalytic activity for the production of the aforesaid aromatic polyester when used alone.

Still another obyect of this invention is to provide a process for producing an aromatic polyester having trimethylene glycol or tetramethylene glycol as a main glycol component with a desired high degree of polymerization at an increased rate of polymerization using the novel catalyst system of this invention.

Yet another object of this invention is to provide a commercially useful process for rapidly producing an aromatic polyester having trimethylene glycol or tetramethylene glycol as a main glycol component with fully satisfactory properties and an increased degree of polymerization while permitting the formation of distillable by-products derived from trimethylene glycol or tetramethylene glycol, such as acrolein or tetrahydrofuran, to some extent.

Other objects and advantages of this invention will become apparent from the following description.

These objects and advantages of this invention are achieved in accordance with this invention by a process for producing an aromatic polyester having an aromatic dicarboxylic acid as a main acid component and trimethylene glycol or tetramethylene glycol as a main glycol component from a starting material composed mainly of an aromatic dicarboxylic acid or its functional derivative and trimethylene glycol or tetramethylene glycol, wherein at least one organometallic catalyst selected from the group consisting of organotitanium compounds and organotin compounds and at least one promoter selected from organic sulfonic acids and aliphatic polycarboxylic acids and being capable of increasing the catalytic activity of the organometallic catalyst are added to the reaction system so that the promoter increases the catalytic activity of the organo-metallic catalyst, and an aromatic polyester having an increased degree of polymerization is formed at an increased rate of polymerization.

The novel catalyst system used in the process of this invention is composed of an organometallic catalyst (organotitanium compound or organotin compound) which is known as a catalyst for the production of an aromatic polyester having trimethylene glycol or tetramethylene glycol as a glycol component, and an organic sulfonic acid or an aliphatic polycarboxylic acid which is not known as a catalyst for the production of the aromatic polyester and when used alone, does not substantially show catalytic activity.

The organic sulfonic acid or the aliphatic polycarboxylic acid, when used alone, does not substantially show catalytic activity, but promotes the catalytic activity of the organo-metallic catalyst in the reaction system of producing the aromatic polyester having trimethylene glycol or tetramethylene glycol as a main glycol component. Accordingly, it is called a promoter in the present application.

It has been known to copolymerize an aliphatic dicarboxylic acid component such as adipic acid in the production of an aromatic polyester having tetramethylene glycol as a major glycol component. With this technique, it is desired to impart a new property positively to the polymer by the copolymerization of the aliphatic dicarboxylic acid component, and the proportion of the aliphatic dicarboxylic acid to be copolymerized should be at least 0.5 mole %, for example (see Japanese Laid-Open Patent Publication No. 154,515/1981 cited hereinabove). When used in such a large amount as is suitable as a comonomer, the aliphatic dicarboxylic acid does not substantially show the activity of a promoter in the process of this invention. The use of the organic sulfonic acid and the aliphatic polycarboxylic acid as a promoter in the present invention clearly differs from its use as a comonomer.

The organometallic catalyst used in this invention is an organotitanium compound or an organotin compound. These organometallic compounds are known as catalysts for esterification, transesterification or polycondensation in the production of aromatic polyesters having trimethylene glycol or tetramethylene glycol as a main glycol component.

The organotitanium compounds disclosed, for example, in the specifications of U.S. Pat. Nos. 2,822,348, 3,047,515, 3,644,291 and 4,010,145, British Pat. No. 991,020 and West German Pat. No. 1,495,776 may be used as the organotitanium compound in this invention. Examples of preferred organotitanium compounds that can be used in this invention include tetrabutyl titanate, tetraisopropyl titanate, tetra(2-ethylhexyl)titanate, tetrastearyl titanate, diisopropoxy-bis(acetylacetonato)-titanium, di-n-butoxy-bis(triethanolaminato)titanium, tributylmonoacetyl titanate, triisopropylmonoacetyl titanate, dihydroxybis(lactate)titanium, titanium isopropoxyoctylene glycolate, isopropoxytitanium triisostearate, tetrabenzoic acid titanate, titanium methylate magnesium, titanium butylate magnesium, titanium octylate magnesium, titanium butylate calcium, titanium ethylate strontium, the reaction product of tetrabutyl titanate and trimellitic anhydride, partially hydrolyzed products of the foregoing compounds; and titanium oxalate, dioxalate potassium titanate (III), dioxalate ammonium titanate (III), oxodioxalate hydrogen titanate (IV), oxodioxalate sodium titanate (IV), oxodioxalate barium titanate (IV), trioxalate potassium titanate (IV), and hydrates of the foregoing compounds. Of these, tetrabutyl titanate and tetraisopropyl titanate are especially preferred in this invention.

The compounds disclosed, for example, in U.S. Pat. Nos. 2,720,507 and 3,425,997 can be used as the organotin compounds.

Examples of preferred organotin compounds which can be used in this invention include methylphenyltin oxide, tetraethyl tin, dibutyltin oxide, didodecyltin oxide, triethyltin hydroxide, triphenyltin hydroxide, triisobutyltin acetate, dibutyltin diacetate, diphenyltin dilaurate, monobutyltin trichloride, dibutyltin dichloride, tributyltin chloride, dibutyltin sulfite, and butylhydroxytin oxide. Of these, dibutyltin oxide and butylhydroxytin oxide are especially preferred in the present invention.

The promoter used in the process of this invention is an organic sulfonic acid or an aliphatic polycarboxylic acid. Aliphatic monocarboxylic acids or aromatic carboxylic acids do not substantially show a promoter effect.

The organic sulfonic acids used in this invention may include, for example, aromatic or aliphatic mono- or poly-sulfonic acids, or their metal salts such as alkali or alkaline earth metal salts, their esters and their halides.

Preferred aromatic sulfonic acids are, for example, compounds represented by the following formula

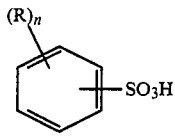

wherein R represents a hydrogen atom, an alkyl group having 1 to 4 carbon atoms, a hydroxyl group, a carboxyl group, a ($C_1$-$C_4$ alkyl)oxycarbonyl group, a nitro group, an amino group, a hydroxyamino group, a hydrazino group or a sulfonic acid group, n is an integer of 1 or 2, provided that when n is 2, the two R's may be identical or different, and compounds capable of producing aromatic sulfonic acids in the reaction system, such as their metal salts, esters or acid halides.

The $C_1$-$C_4$ alkyl group represented by R may be linear or branched, and represents methyl, ethyl, propyl or butyl.

Examples of the aromatic sulfonic acid compounds include aromatic sulfonic acids such as benzenesulfonic acid, toluenesulfonic acid, phenolsulfonic acid, sulfobenzoic acid, nitrobenzenesulfonic acid, anilinesulfonic acids (orthanilic acid, metanilic acid, and sulfanilic acid), phenylhydroxylaminesulfonic acid, hydrazinobenzenesulfonic acid and benzenedisulfonic acid; metal salts thereof such as sodium benzenesulfonate and sodium toluenesulfonate; esters thereof such as dimethyl sulfonbenzoate; and acid halides thereof such as benzenesulfonyl chloride.

The aliphatic sulfonic acids are preferably alkylsulfonic acids having 1 to 18 carbon atoms, alkenylsulfonic acids having 3 to 18 carbon atoms, and compounds capable of producing aliphatic sulfonic acids in the reaction system, such as their metal salts, esters or acid halides. The alkyl group having 1 to 18 carbon atoms and the alkenyl group having 3 to 18 carbon atoms may be linear or branched. Examples of the alkyl group having 1 to 18 carbon atoms are methyl, ethyl, propyl, butyl, pentyl, hexyl, heptyl, octyl, nonyl, decyl, undecyl, dodecyl, tridecyl, tetradecyl, heptadecyl and octadecyl.

The alkenyl group having 3 to 18 carbon atoms are allyl (2-propenyl), 3-butenyl, 4-pentenyl and 10-undecenyl.

Thus preferred examples of the alkylsulfonic acids include alkylsulfonic acids such as methanesulfonic acids, ethanesulfonic acids, propanesulfonic acids, butanesulfonic acid, pentanesulfonic acid, hexanesulfonic acid, tetradecanesulfonic acid; metal salts thereof such as sodium and potassium salts; esters thereof such as methyl or ethyl esters thereof; and acid halides thereof such as their acid chlorides.

Examples of preferred alkenylsulfonic acids are allylsulfonic acid, 3-butenylsulfonic acid and 4-pentenylsulfonic acid; and metal salts, esters and acid halides thereof similar to the above.

The aliphatic polycarboxylic acids used in this invention are aliphatic, di-, tri- or higher polycarboxylic acids or their functional derivatives such as their metal salts, anhydrides, esters or acid halides.

The aliphatic polycarboxylic acids may be linear, branched or cyclic.

Examples of the aliphatic polycarboxylic acids include aliphatic dicarboxylic acids having 2 to 15 carbon atoms such as oxalic acid, malonic acid, succinic acid, glutaric acid, adipic acid, pimelic acid, suberic acid, azelaic acid, sebacic acid, and brassylic acid; aliphatic tricarboxylic acids having 5 to 10 carbon atoms such as $HOOCCH_2CH(COOH)_2$, $CH_3CH(COOH)CH(COOH)_2$, $HOOCCH_2CH_2CH(COOH)_2$, $HOOCCH_2CH(COOH)CH_2COOH$ (tricarballylic acid), $HOOCCH(C_4H_9)CH(COOH)CH_2COOH$, $HOOC(CH_2)_3CH(COOH)_2$, $HOOCCH_2CH(COOH)(CH_2)_2COOH$, $HOOCCH(CH_3)CH(COOH)(CH_2)_2COOH$, $HOOC(CH_2)_4CH(COOH)_2$, $HOOCCH_2CH(COOH)(CH_2)_3COOH$, $HOOCCH(CH_3)CH(COOH)(CH_2)_3COOH$, $HOOCCH_2CH(COOH)(CH_2)_2CH(CH_3)COOH$, $HOOC(CH_2)_2CH(COOH)(CH_2)_4COOH$, $HOOC(CH_2)_3CH(COOH)(CH_2)_3COOH$, cyclopropanetricarboxylic acid, cyclobutanetricarboxylic acid and cyclohexanetricarboxylic acid; aliphatic tetracarboxylic acids having 6 to 11 carbon atoms such as $(HOOC)_2CHCH(COOH)_2$, $HOOCCOOH)_2CH_2COOH$, $HOOCCH_2CH(COOH)CH(COOH)CH_2COOH$, $(HOOC)_2CH(CH_2)_3C(C_2H_5)(COOH)_2$, $HOOC(CH_2)_2C(COOH)_2(CH_2)_2COOH$, $HOOCCH_2CH(COOH)CH(COOH)(CH_2)_2COOH$, cyclopropanetetracarboxylic acid, 2,4-dicarboxy-1,3-cyclobutyldiacetic acid, and cyclobutanetetracarboxylic acid; metal salts thereof, such as alkali metal salts and alkaline earth metal salts thereof; anhydrides thereof such as succinic anhydride; and acid halides thereof.

In the process of this invention, the organic sulfonic acids are preferably used.

Among the aforesaid organic sulfonic acids and aliphatic polycarboxylic acids, p-toluenesulfonic acid, p-hydrazinobenzenesulfonic acid, sulfanilic acid, sodium salts of ($C_{12}$–$C_{14}$ alkyl)sulfonic acids, dimethyl 5-sodiumsulfoisophthalate, succinic anhydride and adipic acid are especially preferred.

The process of this invention is performed by adding the organometallic catalyst and the promoter to the reaction system for producing an aromatic polyester having trimethylene glycol or tetramethylene glycol as a main glycol component.

The aromatic polyester to be produced by the process of this invention has an aromatic dicarboxylic acid as a main acid component and trimethylene glycol or tetramethylene glycol as a main glycol component. This aromatic polyester is produced from a starting material consisting mainly of the aromatic dicarboxylic acid or its functional derivative and trimethylene glycol or tetramethylene glycol.

The aromatic dicarboxylic acid is a compound in which carboxyl groups are directly bonded to the aromatic ring, and includes, for example, terephthalic acid, isophthalic acid, naphthalenedicarboxylic acids, diphenyldicarboxylic acid, and diphenyletherdicarboxylic acid. Terephthalic acid is especially preferred. One or more aromatic dicarboxylic acids may be used.

The functional derivative of the aromatic dicarboxylic acid is a compound capable of forming a new ester upon reaction with trimethylene glycol or tetramethylene glycol. For example, it is a dialkyl ester of an aromatic dicarboxylic acid such as the dimethyl or diethyl ester, or an aromatic dicarboxylic acid dihalide such as the dichloride.

In the process of this invention, the starting material may contain a difunctional carboxylic acid other than the aromatic dicarboxylic acids, or its functional derivative, and/or a glycol other than trimethylene glycol or tetramethylene glycol as a minor component.

Examples of the difunctional carboxylic acids other than the aromatic dicarboxylic acids include aliphatic dicarboxylic acids such as oxalic acid, malonic acid, succinic acid, adipic acid, sebacic acid and dodecanedicarboxylic acid; alicyclic dicarboxylic acids such as hexahydroterephthalic acid, decalindicarboxylic acid, tetralindicarboxylic acid; and hydroxycarboxylic acids such as glycollic acid and p-hydroxybenzoic acid. Functional derivatives of these may likewise be used preferably. Their methyl esters or acid halides are examples.

Examples of the glycols other than trimethylene glycol or tetramethylene glycol include aliphatic diols such as ethylene glycol, propylene glycol, 1,3-butanediol and neopentyl glycol; alicyclic diols such as cyclohexane dimethanol and tricyclodecane dimethylol; and aromatic diols such as bisphenol A, bisphenol S, bishydroxyethoxybisphenol A and tetrabromobisphenol A.

Furthermore, there can also be used a polyfunctional compound such as trimellitic acid, trimesic acid, pyromellitic acid, tricarballylic acid, trimethylolpropane, glycerol and pentaerythritol, or a monofunctional compound such as naphthoic acid, stearyl alcohol, palmitic acid or a derivative thereof in amounts in which the resulting aromatic polyester is substantially linear.

The organometallic catalyst and the promoter may be added at any desired stage up to the formation of an aromatic polyester of the desired degree of polymerization from the starting material so long as they are used such that the promoter increases the catalytic activity of the organometallic compound. Since the organometallic catalyst used in this invention has activity in any of esterification, ester interchange and polycondensation, the catalyst and the promoter can generally be added to the reaction system in a relatively early stage in order to produce rapidly the aromatic polyester having the desired high degree of polymerization. For example, by adding the organometallic catalyst and the promoter to the reaction system in the early stage of the ester interchange reaction, not only the ester interchange reaction time but also the polycondensation time can be shortened. In this case, the overall reaction time can be greatly shortened as compared with the case of adding the organometallic catalyst and the promoter after the ester interchange-reaction has substantially ended.

In the process of this invention, the organometallic catalyst and the promoter may be added simultaneously or at different times. In the latter case, either of them may be added first. When they are added simultaneously, it is desirable for the organometallic catalyst and the promoter to make contact first with the starting material in the polyester-forming reaction system before contacting them with each other. For example, it is preferred that they be added separately from two separate openings of the reactor located at spaced-apart positions. In the case of simultaneous addition, the organometallic catalyst and the promoter may be added after premixing. In this case, it is desirable to add the mixture to the reaction system as early as possible after mixing. In other words, they should desirably be mixed immediately before addition to the reaction system, Investigations of the present inventors have shown that the organometallic catalyst and the promoter may be premixed before addition if the premixture is added to the reaction system at room temperature within about 5 minutes after the mixing. Addition of the two after pre-mixing has the advantage that the desired amounts of the catalyst and the promoter can be surely and advantageously added to the reaction system because the catalyst and the promoter are weighed before they are added to a reaction vessel, and only one opening in the reaction vessel suffices for adding the pre-mixture.

When one of the organometallic catalyst and the promoter is added first and then the other is added, it is desirable not to set a long time interval between the two additions. If the time interval is too long, the action of the promoter to shorten the reaction time tends to be reduced. Furthermore, since in the present invention the reaction time can be shortened by the copresence of the promoter and the organometallic catalyst, it is undesirable that the time during which only one of them exists in the reaction system is too long. The time running from the addition of one of the organometallic catalyst and the promoter to the addition of the other is preferably up to 30 minutes, more preferably up to 10 minutes, especially preferably up to 5 minutes. Preferably, the organometallic catalyst is added to the reaction before the promoter is added.

The organometallic catalyst can be used in known catalytic amounts. Preferably, it is about 0.005 to about 0.2 mole%, more preferably about 0.008 to about 0.1 mole%, based on the acid component of the starting material. Desirably, the promoter is used in an amount of about 0.003 to about 0.1 mole%, more preferably about 0.005 to about 0.08 mole%, based on the entire acid component of the starting material.

The amount of the promoter may be about 0.1 to about 10 moles, preferably about 0.3 to about 3 moles, per mole of the organometallic catalyst.

According to the process of this invention, the combination of the organometallic catalyst and the promoter exhibits excellent catalytic activity in any reaction system in the so-called direct polymerization method in which the aromatic dicarboxylic acid is used as the starting material, and the so-called ester interchange method in which a diester of the aromatic dicarboxylic acid is used.

The organometallic catalyst and the promoter may be added at any stage to such a reaction system. But in order to obtain the aromatic polyester having the desired high degree of polymerization while reducing the amounts of distillable by-products derived from tetramethylene glycol or trimethylene glycol, they are preferably added at the following times. In the case of the direct polymerization, the organometallic catalyst and the promoter (preferably an organic sulfonic acid), are added to the reaction system preferably when the esterification has considerably proceeded; or the organometallic catalyst is added to the reaction system before the esterification has considerably proceeded, and then the promoter is added. On the other hand, in the case of the ester interchange reaction, the organometallic catalyst and the promoter are added to the reaction system after the ester interchange has considerably proceeded; or the organometallic catalyst is added to the reaction before the ester interchange has considerably proceeded, and then the promoter is added.

In the aforesaid preferred embodiments, the promoter is added after the esterification or the ester interchange has considerably proceeded. By this manner of addition, an aromatic polyester having the desired high degree of polymerization can be produced at an increased rate of polymerization while inhibiting the formation of distillable by-products which is promoted by the presence of the promoter during the esterification or the ester interchange. The time when the esterification or the ester interchange has considerably proceeded corresponds to the time when the conversion in the esterification or the ester interchange has reached at least about 70%, preferably at least 85%.

The addition of the promoter after the esterification has considerably proceeded is very effective for increasing the catalytic activity of the organometallic catalyst in accordance with the process of this invention in the production of a copolyester by a direct polymerization method using an aliphatic dicarboxylic acid or an alicyclic dicarboxylic acid as a minor dicarboxylic acid component.

The following examples illustrate the present invention more specifically.

EXAMPLES 1 TO 9

A mixture consisting of 97.1 parts by weight of dimethyl terephthalate, 67.6 parts by weight of tetramethylene glycol, and the amounts indicated in Table 1 of each tetrabutyl titanate (catalyst) and each of the sulfonic acid compounds (promoter) indicated in Table 1 was prepared in the following manner.

A stirred reaction vessel was charged with tetramethylene glycol and dimethyl terephthalate, and then tetrabutyl titanate was added. About 1 minute after the addition of tetrabutyl titanate, the sulfonic acid compound was added.

The starting mixture was subjected to ester interchange reaction (EI) while it was maintained at 170° C.

of tetrahydrofuran formed as a by-product and the inherent viscosity of the polymer are shown in Table 1.

The inherent viscosity of the polymer in these and subsequent examples was calculated from its solution viscosity determined at 35° C. in an ortho-chlorophenol solution of the polymer. The amounts of the catalyst and the promoter added were based on the weight of dimethyl terephthalate (the same basis applies hereinafter).

TABLE 1

| Example | Catalyst Amount (mmole %) | Catalyst Time of addition | Promoter Compound | Promoter Amount (mmole %) | Promoter Time of addition | High vacuum polycondensation time (min.) | Amount of tetrahydrofuran formed (parts by weight) | Inherent viscosity of the polymer |
|---|---|---|---|---|---|---|---|---|
| 1 | 15 | Early stage of EI | $CH_3$—⟨⟩—$SO_3H$ | 15 | Early stage of EI | 70 | 7 | 1.00 |
| 2 | 20 | Early stage of EI | $NH_2NH$—⟨⟩—$SO_3H$ | 30 | Early stage of EI | " | 9 | 0.90 |
| 3 | 30 | Early stage of EI | $NH_2$—⟨⟩—$SO_3H$ | 20 | Early stage of EI | " | 8 | 0.95 |
| 4 | 50 | Early stage of EI | $C_{14}H_{29}SO_3Na$ | 50 | Early stage of EI | 50 | 7 | 0.85 |
| 5 | " | Early stage of EI | $HOOC$—⟨⟩—$SO_3Na$ | " | Early stage of EI | 60 | 6 | 0.88 |
| 6 | " | Early stage of EI | $CH_2=CH—CH_2SO_3Na$ | " | Early stage of EI | 50 | 7 | 0.80 |
| 7 | " | Early stage of EI | $NO_2$—⟨⟩—$SO_3H$ | " | Early stage of EI | 70 | 7 | 0.90 |
| 8 | " | Early stage of EI | $HOOC$—⟨⟩(—$SO_3Na$)—$COOH$ | " | Early stage of EI | " | 7 | 0.90 |
| 9 | " | Early stage of EI | $CH_3OOC$—⟨⟩(—$SO_3Na$)—$COOCH_3$ | " | Early stage of EI | " | 6 | 0.98 |

When a predetermined amount of methanol distilled off and EI ended substantially, the temperature of the reaction mixture was raised to 245° C. The pressure of the reaction system was reduced, and the reaction mixture was polymerized at the same temperature under a pressure of 30 mmHg for 30 minutes. Then, the pressure was reduced to 0.5 mmHg, and the polymerization was carried out for a predetermined period of time (the high vacuum polycondensation time in Table 1). The amount

COMPARATIVE EXAMPLES 1 TO 5

The same reaction as in Examples 1 to 2 were carried out under the conditions shown in Table 2.

In Comparative Example 1, the organic sulfonic acid was not used, and tetrabutyl titanate alone was used. In Comparative Example 2, tetrabutyl titanate was not used, and p-toluenesulfonic acid was used as the organic sulfonic acid. In Comparative Example 3, there was used a mixture obtained by heating an equimolar mixture of p-toluenesulfonic acid and tetrabutyl titanate at 150° C. for 20 minutes. In Comparative Example 4, sulfuric acid was used instead of the organic sulfonic acid. In Comparative Example 5, sodium sulfate was used instead of the organic sulfonic acid.

The amounts of tetrahydrofuran formed as a by-product and the inherent viscosities of the resulting polyesters are shown in Table 2.

EXAMPLES 10 TO 13 AND COMPARATIVE EXAMPLES 6 TO 10

The same reaction as in Examples 1 to 9 was carried out under the conditions shown in Table 3 except that instead of the organic sulfonic acid, aliphatic dicarboxylic acids (Examples 10 to 13), aromatic dicarboxylic acids (Comparative Examples 6 to 9) or an aliphatic monocarboxylic acid (Comparative Example 10) were used.

TABLE 2

| Comparative Example | Catalyst (tetrabutyl titanate) | | Promoter | | | High-vacuum polycondensation time (min.) | Amount of tetrahydrofuran (parts by weight) | Inherent viscosity of polyester |
|---|---|---|---|---|---|---|---|---|
| | Amount (mmole %) | Time of addition | Compound | Amount (mmole %) | Time of addition | | | |
| 1 | 42 | At the start of EI | None | — | — | 70 | 4 | 0.81 |
| 2 | — | — | p-toluenesulfonic acid | 42 | At the start of EI | — | 20 | (The reaction did not proceed.) |
| 3 | 42 | At the start of EI | p-toluenesulfonic acid (used as a preheated mixture with tetrabutyl titanate) | 42 | At the start of EI | 70 | 5 | 0.85 |
| 4 | 50 | At the start of EI | sulfuric acid | 50 | At the start of EI | — | 30 | (The reaction did not proceed.) |
| 5 | " | At the start of EI | sodium sulfate | " | At the start of EI | 70 | 8 | 0.75 |

The amounts of tetrahydrofuran formed as a by-product and the inherent viscosities of the polyesters are shown in Table 3.

TABLE 3

| Run No. | Catalyst | | Promoter | | | High vacuum polycondensation time (min.) | Amount of tetrahydrofuran (parts by weight) | Inherent viscosity of polyester |
|---|---|---|---|---|---|---|---|---|
| | Amount (mmole %) | Time of addition | Compound | Amount (mmole %) | Time of addition | | | |
| Example | | | | | | | | |
| 10 | 42 | At the start of EI | ![maleic anhydride structure: CH2—C(=O)—O—C(=O)—CH2] | 42 | At the start of EI | 40 | 6 | 0.82 |
| 11 | " | At the start of EI | CH2—COOH \| CH2COOH | " | At the start of EI | " | 6 | 0.85 |
| 12 | " | At the start of EI | HOOC(CH2)4COOH | " | At the start of EI | " | 6 | 0.90 |
| 13 | " | At the start of EI | HOOC(CH2)8COOH | " | At the start of EI | 60 | 6 | 0.85 |
| Comparative Example | | | | | | | | |
| 6 | 50 | At the start of EI | (phenyl with NH2 and COOH) | 50 | At the start of EI | 70 | 5 | 0.65 |

TABLE 3-continued

| Run No. | Catalyst Amount (mmole %) | Catalyst Time of addition | Promoter Compound | Promoter Amount (mmole %) | Promoter Time of addition | High vacuum polycondensation time (min.) | Amount of tetrahydrofuran (parts by weight) | Inherent viscosity of polyester |
|---|---|---|---|---|---|---|---|---|
| 7 | " | At the start of EI | HO—⌬—COOH | " | At the start of EI | " | 6 | 0.72 |
| 8 | 42 | At the start of EI | ⌬—COOH | 42 | At the start of EI | " | 5 | 0.85 |
| 9 | " | At the start of EI | HOOC—⌬—COOH | " | At the start of EI | " | 6 | 0.83 |
| 10 | " | At the start of EI | CH$_3$COOH | " | At the start of EI | " | 6 | 0.82 |

EXAMPLES 14 TO 17 AND COMPARATIVE EXAMPLES 11 AND 12

The same reaction as in Examples 1 to 9 was carried out except that each of the catalysts and each of the promoters shown in Table 4 were used under the conditions shown in Table 4.

acid was prepared in the same way as in Examples 1 to 9. The mixture was subjected to ester interchange reaction (EI) while maintaining the temperature of the mixture at 170° C. After a predetermined amount of methanol distilled off, the temperature of the inside of the reaction vessel was raised to 260° C., and the pressure of the reaction system was reduced. Thus, the reaction

TABLE 4

| Run No. | Catalyst Compound | Catalyst Amount (mmole %) | Catalyst Time of addition | Promoter Compound | Promoter Amount (mmole %) | Promoter Time of addition | High vacuum polycondensation time (min.) | Amount of tetrahydrofuran (parts by weight) | Inherent viscosity of polyester |
|---|---|---|---|---|---|---|---|---|---|
| Example 14 | K$_2$TiO(C$_2$O$_4$)$_2$ | 42 | At the start of EI | CH$_3$—⌬—SO$_3$H | 42 | At the start of EI | 50 | 8 | 0.95 |
| Comparative Example 11 | (C$_4$H$_9$)$_2$SnO | 100 | At the start of EI | — | — | — | 100 | 4 | 0.80 |
| Example 15 | " | " | At the start of EI | CH$_3$—⌬—SO$_3$H | 42 | At the start of EI | 70 | 3 | 0.82 |
| Comparative Example 12 | Ti(OC$_4$H$_9$)$_4$ / (C$_4$H$_9$)$_2$SnO | 20 / 50 | At the start of EI | — | — | — | 70 | 5 | 0.75 |
| Example 16 | Ti(OC$_4$H$_9$)$_4$ / (C$_4$H$_9$)$_2$SnO | 20 / 50 | At the start of EI | CH$_3$—⌬—SO$_3$H | 42 | At the start of EI | " | 6 | 0.85 |
| Example 17 | Ti(OC$_4$H$_9$)$_2$ | 15 | At the start of EI | CH$_3$—⌬—SO$_3$H HOOC(CH$_2$)$_4$COOH | 10 / 10 | At the start of EI | 70 | 7 | 1.05 |

EXAMPLE 18 AND COMPARATIVE EXAMPLE 13

A mixture consisting of 122.1 parts by weight of dimethyl naphthalene-2,6-dicarboxylate, 67.6 parts by weight of tetramethylene glycol, 40 mmole% of tetrabutyl titanate and 40 mmole% of p-toluenesulfonic acid was prepared in the same way as in Examples 1 to 9. mixture was polymerized at this temperature for 30 minutes under 30 mmHg. Then, the pressure was reduced to 0.5 mmHg and the polymerization was carried out for 100 minutes. The resulting poly(tetramethylene naphthalene-2,6-dicarboxylate) had an inherent viscosity of 0.95.

For comparison, the above procedure was repeated except that p-toluenesulfonic acid was not used. A polymer having an inherent viscosity of 0.80 was obtained.

EXAMPLE 19 AND COMPARATIVE EXAMPLE 14

Terephthalic acid (83.1 parts by weight), 81.1 parts by weight of tetramethylene glycol were charged into a stirred reaction vessel, and heated with stirring. When the temperature of the inside of the vessel reached 170° C., 50 mmole% of tetrabutyl titanate was added, and about 5 minutes later, 40 mmole% of p-toluenesulfonic acid was added. The reaction temperature was then raised to 230° C., and the esterification was carried out for 180 minutes to a conversion of 98%. Then, the esterification product was polymerized at 245° C. and 0.5 mmHg for 80 minutes. The amount of tetrahydrofuran formed as a by-product was 15 parts by weight. The resulting polyester had an inherent viscosity of 0.98.

For comparison, the above procedure was repeated except that p-toluenesulfonic acid was not used. A polymer having an inherent viscosity of 0.83 was obtained.

EXAMPLE 20

Terephthalic acid (83.1 parts by weight) and 81.1 parts by weight of tetramethylene glycol were charged into a stirred reaction vessel, and heated with stirring. The temperature of the inside of the vessel was raised to 230° C., and the esterification was carried out at this temperature for 180 minutes to a conversion of 98%.

Then, 50 mmol% of tetrabutyl titanate was added to the resulting esterification product, and about 5 minutes later, 40 mmole% of p-toluenesulfonic acid was added. The esterification product was polymerized at 245° C. and 0.5 mmHg for 70 minutes.

The amount of tetrahydrofuran formed as a by-product was 8 parts by weight, and the resulting polyester had an inherent viscosity of 1.10.

EXAMPLE 21

A mixture consisting of 97.1 parts by weight of dimethyl terephthalate, 57.1 parts by weight of trimethylene glycol, 50 mmole% of tetrabutyl titanate and 50 mmole% of p-toluenesulfonic acid was prepared in the same way as in Examples 1 to 9, and subjected to ester interchange reaction (EI) while the temperature of the inside of the reaction vessel was maintained at 190° C. After a predetermined amount of methanol distilled off, the temperature of the inside of the reaction vessel was raised to 250° C. and the pressure of the reaction system was reduced to 30 mmHg. The reaction mixture was heated under these conditions for 30 minutes, and then further polymerized for 80 minutes under 0.5 mmHg. The resulting poly(trimethylene terephthalate) had an inherent viscosity of 0.90. The distillate formed during the polymerization after the ester interchange reaction contained 3.5 parts by weight to acrolein as a by-product.

For comparison, the above procedure was repeated without using p-toluenesulfonic acid. A polymer having an inherent viscosity of 0.75 was obtained.

EXAMPLES 22 AND 23 AND COMPARATIVE EXAMPLE 15

In each run, a polymer was produced in the same way as in Example 1 except that the time which elapsed from the addition of tetrabutyl titanate until the addition of p-toluene sulfonate was changed.

Table 5 summarizes the amounts of the catalysts and the promoters, the times of their addition, the amounts of tetrahydrofuran formed as a by-product and the inherent viscosities of the polymers.

TABLE 5

| Run No. | Catalyst (tetrabutyl titanate) | | Promoter | | | High vacuum polycondensation time (min.) | Amount of tetrahydrofuran (parts by weight) | Inherent viscosity of the polymer |
| --- | --- | --- | --- | --- | --- | --- | --- | --- |
| | Amount (mmole %) | Time of addition | Compound | Amount (mmole %) | Time of addition | | | |
| Example 22 | 15 | At the start of EI | p-Toluenesulfonic acid | 15 | At the start of EI; 10 minutes after addition of the catalyst | 70 | 7 | 0.95 |
| Comparative Example 15 | " | At the start of EI | p-Toluenesulfonic acid | " | After EI; 150 minutes after addition of the catalyst | " | 6 | 0.82 |
| Example 23 | 30 | At the start of EI | p-Toluenesulfonic acid | " | After EI; 1 minute after addition of 15 mmole % of the catalyst | " | 5 | 0.93 |
| | 15 | After EI | | | | | | |

What we claim is:

1. A process for producing an aromatic polyester having an aromatic dicarboxylic acid as a main acid component and trimethylene glycol or tetramethylene glycol as a main glycol component from a starting material composed mainly of an aromatic dicarboxylic acid or its polyester forming functional derivative and trimethylene glycol or tetramethylene glycol; wherein at least one organometallic catalyst selected from the group consisting of organotitanium compounds and organotin compounds and from about 0.1 to about 10 moles, per mole of the organometallic catalyst, of at least one promoter which is an aliphatic carboxylic acid or a metal salt thereof, an anhydride thereof, an ester thereof or an acid halide thereof, and being capable of increasing the catalyst activity of the organometallic catalyst are added to the reaction system so that the promoter increases the catalytic activity of the organometallic catalyst, and an aromatic polyester having an increased degree of polymerization is formed at an increased rate of polymerization.

2. The process of claim 1 wherein the organometallic catalyst and the promoter are added to the reaction system so that at least one of them contacts the polyester-forming mixture in the reaction system before they contact each other.

3. The process of claim 1 wherein the organometallic catalyst and the promoter are contacted with each other immediately before they contact the polyester-forming mixture in the reaction system, and thereafter they are added to the reaction system.

4. The process of claim 1 wherein after one of the organometallic catalyst and the promoter contacts the polyester-forming mixture in the reaction system, the other is added within about 30 minutes.

5. The process of claim 1 or 4 wherein the organometallic catalyst is added to the reaction system before the promoter is added.

6. The process of claim 1 wherein the aliphatic polycarboxylic acid is an aliphatic dicarboxylic acid having 2 to 15 carbon atoms or its metal salt, anhydride, ester or acid halide.

7. The process of claim 1 wherein an aromatic polyester having an increased degree of polymerization is formed at an increased rate of polymerization with a reduced amount of distillable by-products from a starting material composed of a diester of an aromatic dicarboxylic acid and trimethylene glycol or tetramethylene glycol by adding the organometallic catalyst and the promoter to the reaction system after the ester interchange reaction has considerably proceeded, or by adding the organometallic catalyst before the ester interchange reaction has considerably proceeded, and thereafter adding the promoter.

8. The process of claim 1 wherein the organometallic catalyst is used in an amount of about 0.005 to about 0.2 mole% based on the total amount of the acid component in the starting material.

9. The process of claim 1 wherein the promoter is used in an amount of about 0.003 to about 0.1 mole% based on the total amount of the acid component in the starting material.

10. The process of claim 1 wherein the aromatic dicarboxylic acid is terephthalic acid.

11. The process of claim 1 wherein the organometallic catalyst is an organotitanium compound.

12. The process of claim 1 wherein the organometallic catalyst is an organotin compound.

13. The process of claim 1 wherein the organometallic catalyst is used in an amount of about 0.005 to about 0.2 mole% based on the total amount of the acid component in the starting material.

* * * * *